(12) United States Patent
Dragoi et al.

(10) Patent No.: US 7,654,002 B2
(45) Date of Patent: Feb. 2, 2010

(54) SIDE MEMBER FOR A VEHICLE

(75) Inventors: Cristian Dragoi, München (DE); Nils Drecoll, Hamburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 619 days.

(21) Appl. No.: 11/180,626

(22) Filed: Jul. 14, 2005

(65) Prior Publication Data

US 2006/0053733 A1    Mar. 16, 2006

Related U.S. Application Data

(63) Continuation of application No. PCT/EP2004/000133, filed on Jan. 10, 2004.

(30) Foreign Application Priority Data

Jan. 15, 2003  (DE) ................. 103 01 181

(51) Int. Cl.
| | |
|---|---|
| B21C 23/00 | (2006.01) |
| B21D 28/00 | (2006.01) |
| B21D 31/02 | (2006.01) |
| B21D 47/00 | (2006.01) |
| B21D 53/88 | (2006.01) |
| B62D 21/00 | (2006.01) |
| B62K 3/00 | (2006.01) |
| B60J 7/00 | (2006.01) |

(52) U.S. Cl. ............ 29/897.2; 29/897.3; 72/253.1; 72/254; 72/331; 72/334; 180/311; 280/281.1; 280/288.3; 296/203.01; 296/203.03; 296/204; 296/187.12

(58) Field of Classification Search ............... 29/897.2, 29/897.3, 462; 72/253.1, 347, 31.13, 254, 72/260, 261, 264, 276, 331, 334; 180/311; 280/281.1, 288.3; 296/203.1, 203.03, 204, 296/187.12, 190.081, 190.08
See application file for complete search history.

(56) References Cited

U.S. PATENT DOCUMENTS

| | | | | |
|---|---|---|---|---|
| 4,116,095 | A | * | 9/1978 | Cousino ............... 82/71 |
| 5,398,989 | A | * | 3/1995 | Winter et al. ......... 296/203.03 |
| 5,829,219 | A | * | 11/1998 | Sugawara et al. ...... 52/653.2 |
| 6,592,174 | B1 | * | 7/2003 | Rollin et al. ......... 296/190.08 |
| 6,679,523 | B2 | * | 1/2004 | Yamamoto et al. ...... 280/785 |

(Continued)

FOREIGN PATENT DOCUMENTS

DE          2457 400 A      6/1976

(Continued)

*Primary Examiner*—David P Bryant
*Assistant Examiner*—Alexander P Taousakis
(74) *Attorney, Agent, or Firm*—Crowell & Moring LLP

(57) ABSTRACT

A side member for a vehicle is formed by an extruded profile as well as a closed profile which are both constructed as open profiles with an approximately L-shaped cross-section. On the interior side of the extruded profile, a hollow chamber is situated which is removed in sections along the longitudinal course of the side member in order to achieve a targeted compression behavior (folding) of the side member in the event of an impact of the vehicle. Bushes for receiving the chassis components are inserted in the extruded profile. Like the partial weakening of the hollow chamber, the insertion of bushes takes place before the closing of the side member by connecting the profiles.

8 Claims, 1 Drawing Sheet

U.S. PATENT DOCUMENTS 6,932,405 B2 * 8/2005 Nakagawa et al. ............ 296/29
6,986,536 B1 * 1/2006 Heatherington et al. ..... 293/102

FOREIGN PATENT DOCUMENTS

| DE | 196 45 962 A | 3/1998 |
| DE | 101 13 539 A | 10/2002 |
| GB | 2 341 149 A | 3/2000 |

* cited by examiner

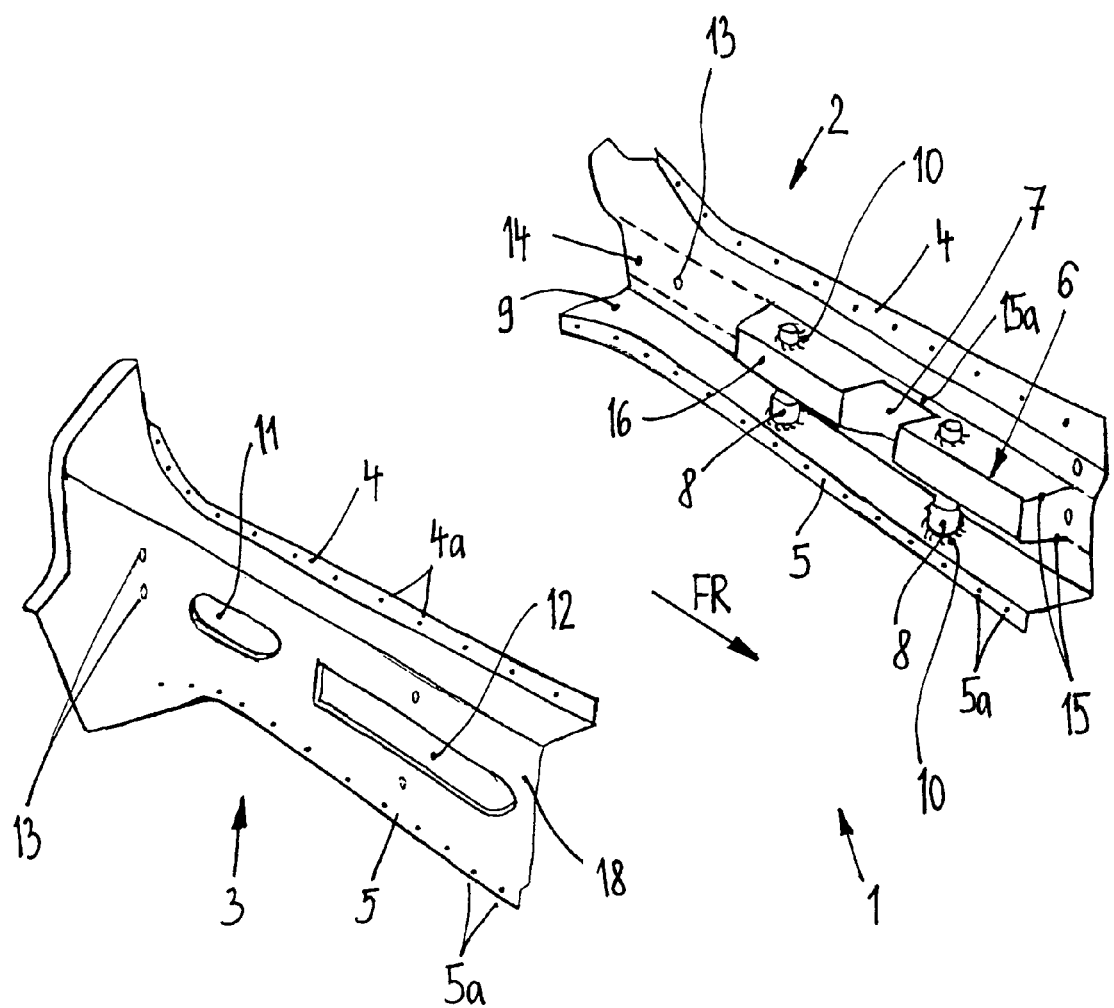

SIDE MEMBER FOR A VEHICLE

This application is a continuation of International Patent Application No. PCT/EP2004/000133 filed on Jan. 10, 2004, designating the United States of America, the entire disclosure of which is incorporated herein by reference. Priority is claimed based on German Patent Application No. 103 01 181.1 filed on Jan. 15, 2003, the disclosure of which is expressly incorporated by reference herein.

BACKGROUND AND SUMMARY OF THE INVENTION

The invention relates to a side member for a vehicle, which has at least one extruded profile.

Side members of this type are generally known and are distinguished by a simple manufacturing. However, a cross-sectional course which varies along the longitudinal dimension cannot easily be achieved. The placing of bushes is also difficult, as demonstrated, for example, in German Patent Document DE 196 45 962 A1.

It is an object of the invention to provide an easily producible side member of a high stiffness for a vehicle while using an extruded profile. This object is achieved according to preferred embodiments of the invention by providing a side member for a vehicle, which has at least one extruded profile, wherein the extruded profile has an open cross-section, having at least one hollow chamber on an interior side of the open cross-section, a second profile being provided which complements the side member to form a closed cross-section.

Here, it is an important idea to use an extruded profile with an open cross-section and an interior-side hollow chamber and to supplement the open cross-section by a second profile to form a closed cross-section. The good stiffness characteristics of the closed cross-section of the side member with respect to all mechanical types of stress are further improved by the interior hollow chamber. In the case of the side member according to certain preferred embodiments of the invention, it is also possible to implement changes before the placing of the closing profile in the interior of the side member, which changes cannot be made in the case of a closed extruded profile or can be made only at high expenditures.

Such changes are, for example, the inserting of reinforcements, the removal of material in sections, the inserting of fastening elements, etc.

In comparison to a side member produced as a sheet metal shell construction and having an interior stiffening hollow chamber, the integration of the hollow chamber according to the invention onto the extruded profile results in a reduction of the number of components and thus of the required joining operations.

Although a motor vehicle body shell is known from German Patent Document DE 39 18 280 A1, and corresponding U.S. Pat. No. 5,269,585, which has a frame part formed by an extruded profile and covered by a preformed sheet metal part, in the known solution, the closed extruded profile is covered by means of the sheet metal part in order to provide a visible surface with a complicated and changing cross-sectional course toward the exterior side of the motor vehicle. In contrast, in the case of the present invention, an open extruded profile is used which has a stiffening hollow chamber on the interior side, the extruded profile and the second profile together forming the carrying cross-section.

Correspondingly, in a preferred further development of the invention, the hollow chamber is partially removed. This can take place in multiple fashions: Placing at least one slot perpendicular or diagonal to the longitudinal direction of the hollow chamber, placing at least one hole-type opening in the hollow chamber, removing at least one wall of the hollow chamber in sections, etc. As a result of a targeted removal of material, particularly by means of a milling cutter, the deformation of the side member in the event of an impact of the vehicle, can be adjusted such that a reduction of energy which is as optimal as possible is achieved by means of a targeted compression (folding) of the side member.

Analogously, additional material can also be placed in sections in the interior of the side member. Such local reinforcements can influence the deformation behavior of the side member subjected to crash forces just as much as the above-described removals of material.

In addition, the open extruded profile, in a simple manner, permits the insertion of fastening elements, such as bushes for receiving mounted parts on the side members. In the case of a good accessibility, such bushes can be welded into the open extruded profile. As a result, high-expenditure measures for achieving a play-free fit of the bush in the side member, as described in the initially mentioned German Patent Document DE 196 45 962 A1, are not necessary.

The closing profile can be produced and constructed in many different manners. The closing profile advantageously is a preformed sheet metal part, preferably a deep-drawn sheet metal component whose geometry can be freely designed within broad limits. Naturally, it is also conceivable to use an extruded profile as the closing profile, which is deformed, if required, for example, by means of a deep-drawing process.

By means of deep drawing, also the extruded profile with the hollow chamber can receive a cross-section which is variable along its longitudinal course. In this case, the deep drawing is as a rule limited to the areas of the extruded profile which are not stiffened by the hollow profile.

In an advantageous embodiment of the invention, the extruded profile and the closing profile each have an L-shape, which provides good access to the interior of the side member. In addition, in the case of this L-shaped design, the two side member halves can be connected with one another in a simple manner along flanges, for example, by means of a riveted connection. This riveted connection is preferably supplemented by a glued connection.

In addition, the two side member halves can be connected by a slot weld in that, preferably through at least one opening in the closing profile, this closed profile is welded to the hollow chamber of the extruded profile which is situated below it and reaches to the interior side of the closed profile.

As a result of its construction, the side member is particularly suitable to be used as a forward or rearward side member of a motor vehicle. By means of the bushes welded in a simple manner into the interior of the side member, chassis components can be fastened without play.

The two halves of the side member preferably consist of light metal, for example, of an aluminum alloy.

A conceivable embodiment of the invention is illustrated in the drawing and will be described in detail in the following.

BRIEF DESCRIPTION OF THE DRAWINGS

The single FIGURE is a perspective view of the two halves of a side member constructed according to the invention.

DETAILED DESCRIPTION OF THE DRAWINGS

A side member for a vehicle, which in its entirety has the reference number 1, is composed of an extruded profile 2 and of a second, closing, profile 3. For indicating the mounting position of the side member 1 in the vehicle, the driving direction has the reference symbol FR. In the cross-sectional view, the extruded profile 2 and the second profile 3 are each approximately L-shaped and complement one another to form a closed, approximately rectangular cross-section. The profiles 2 and 3 are connected with one another along flanges 4 and 5 by means of a riveting process. The riveting points 4a and 5a are indicated in the drawing.

On its interior side, the extruded profile 2 has a hollow chamber 6 which covers only a portion of the side wall 14 of the extruded profile 2. The hollow chamber 6 has two legs 15 extending approximately perpendicular to the side wall 14 as well as a web 16 connecting the legs 15. In a targeted manner, the hollow chamber 6 causes a stiffening of the open extruded profile and thus of the entire side member 1. In the center area of the extruded profile 2, the hollow chamber 6 is removed over a longitudinal course of several centimeters (milling 7). Here, the milling 7 is implemented such that the web 16 of the hollow chamber 16 was completely removed, and both legs 15 were removed with the exception of a foot section 15a of a low height. On the end section of the side member 1 facing away from the driving direction as well as in its most forward end area, the hollow chamber 6 is completely removed, as indicated in this area which show the original course of the legs 15 along the extruded profile 2.

By way of passage openings in the approximately horizontally extending bottom side 9 of the extruded profile 2, bushes 8 are inserted which are used for receiving chassis parts. The bushes 8 penetrate passage openings in the hollow chamber 6 and are connected by way of weld seams 10 with the underside 9 of the extruded profile as well as with both legs 15 of the hollow chamber 6.

The closing profile 3 is produced as a sheet metal component in a deep drawing process and has reinforcing beads 11 and 12 in its side wall 18. In the area of the reinforcing beads 11 and 12, at least one passage opening may be provided by way of which a slot welded connection of the closing profile 3 takes place with the web 16 of the hollow chamber situated underneath. In a targeted manner, the stiffness of the side member 1 can thereby be increased further because a denting of the side member 1 under load is avoided by one or several local slot welded connections.

At their end sections facing away from the driving direction, the two profiles 2 and 3 each expand in the shape of a bell and are connected with their ends to the carrying structure of the vehicle body shell. Several passage openings 13 for the screwed fastening of mounted parts are provided at the two profiles 2 and 3.

The profiles 2 and 3 consist, for example, of an aluminum alloy, such as AC 300 HF. The bushes 8 are inserted into the side member by way of an MIG welding. Likewise, the slot welds are also implemented in the MIG process.

By means of the connection of the two profiles 2 and 3 along the flanges 4 and 5 by a riveting method, in contrast to a welding operation, no heat is introduced so that no subsequent thermal treatment is required when manufacturing the side members 1 which are highly stressed in the event of a crash. For the sealing-off and further increasing of the stiffness of the side member 1, glue is additionally inserted along the flanges 4 and 5.

What is claimed is:

1. A method of making a longitudinal side member for an automobile, comprising:
    extruding a first profile having a longitudinal length, the first profile having legs forming an open cross-section exhibiting an L-shape and having one flange respectively formed at each free end of the legs and a stiffening hollow chamber formed on an interior side of the first profile between, and spaced apart from, the respective flanges, the hollow chamber having a closed cross-section viewed transverse to the longitudinal length of the first profile,
    removing portions of the hollow chamber,
    forming a second profile having a corresponding longitudinal length, the second profile having legs exhibiting an L-shape cross-section and having one flange respectively formed at each free end of the legs, and
    connecting the respective flanges along the longitudinal lengths of the first and second profiles to form a closed cross-section longitudinal side member.

2. A method according to claim 1, wherein said removing portions includes milling.

3. A method according to claim 1, wherein said forming said second profile includes deep drawing sheet material.

4. A method according to claim 1, wherein said first and second profiles are formed of light metal.

5. A method according to claim 4, wherein said connecting is done by way of a non-welded connection such as a riveting connection and/or a glued connection.

6. A method according to claim 4, comprising attaching at least one support bush to said first profile prior to connecting said profiles together to form the side member, wherein said attaching is performed by forming at least one passage opening in a bottom leg side of the L-shaped first profile and in the hollow chamber and arranging the bush so as to penetrate into both openings.

7. A method of making a longitudinal side member for an automobile comprising:
    extruding a first profile in a substantially L-shaped form with an open cross-section and a stiffening hollow chamber on an interior side of the open cross-section, the hollow chamber having a closed cross-section transverse to a longitudinal direction of the first profile;
    removing portions of the hollow chamber;
    forming at least one passage opening in a bottom leg side of the L-shaped first profile and in the hollow chamber;
    arranging a support bush so as to penetrate into the opening in the hollow chamber and the corresponding opening in the bottom leg side of the L-shaped first profile;
    forming a second profile; and
    connecting the first and second profiles to form a closed cross-section side member for the automobile.

8. A method of making a longitudinal side member for an automobile, comprising:
    extruding a first profile with an open cross-section and a stiffening hollow chamber on an interior side of the open cross-section, the hollow chamber having a closed cross-section transverse to a longitudinal direction of the first profile;
    removing portions of the hollow chamber;
    forming a second profile with a passage opening configured to be adjacent a web of the hollow chamber of the first profile when assembled; and
    connecting the first and second profiles to form a closed cross-section side member, including slot welding the second profile via the passage opening to the web of the first profile.

* * * * *

UNITED STATES PATENT AND TRADEMARK OFFICE
CERTIFICATE OF CORRECTION

PATENT NO. : 7,654,002 B2 Page 1 of 1
APPLICATION NO. : 11/180626
DATED : February 2, 2010
INVENTOR(S) : Dragoi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 996 days.

Signed and Sealed this

Twenty-eighth Day of December, 2010

David J. Kappos
*Director of the United States Patent and Trademark Office*